(12) United States Patent
Arad et al.

(10) Patent No.: US 9,112,818 B1
(45) Date of Patent: Aug. 18, 2015

(54) ENHANCED TAIL DROPPING IN A SWITCH

(75) Inventors: Carmi Arad, Nofit (IL); Aviran Kadosh, Misgav (IL)

(73) Assignee: Marvell Isreal (M.I.S.L) Ltd., Yokneam (IL)

( * ) Notice: Subject to any disclaimer, the term of this patent is extended or adjusted under 35 U.S.C. 154(b) by 618 days.

(21) Appl. No.: 13/022,303

(22) Filed: Feb. 7, 2011

Related U.S. Application Data

(60) Provisional application No. 61/301,776, filed on Feb. 5, 2010.

(51) Int. Cl.
*H04L 12/54* (2013.01)
*H04L 12/861* (2013.01)

(52) U.S. Cl.
CPC ....................................... *H04L 49/90* (2013.01)

(58) Field of Classification Search
None
See application file for complete search history.

(56) References Cited

U.S. PATENT DOCUMENTS

| | | | |
|---|---|---|---|
| 5,901,139 A | 5/1999 | Shinohara | |
| 6,034,945 A | 3/2000 | Hughes et al. | |
| 6,377,546 B1 | 4/2002 | Guerin et al. | |
| 6,504,818 B1 | 1/2003 | Levine | |
| 6,625,159 B1 | 9/2003 | Singh et al. | |
| 7,075,927 B2 | 7/2006 | Mo et al. | |
| 7,245,586 B2 | 7/2007 | Bitar et al. | |
| 7,286,485 B1 | 10/2007 | Ouellette et al. | |
| 7,295,564 B2 * | 11/2007 | Ling et al. | 370/412 |
| 7,397,809 B2 | 7/2008 | Wang | |
| 7,463,630 B2 | 12/2008 | Lee | |
| 7,486,689 B1 * | 2/2009 | Mott | 370/412 |
| 7,602,720 B2 * | 10/2009 | Bergamasco et al. | 370/235 |
| 7,710,969 B2 * | 5/2010 | Szczepanek et al. | 370/392 |
| 7,756,991 B2 * | 7/2010 | Chen et al. | 709/230 |
| 7,802,028 B2 | 9/2010 | Andersen et al. | |
| 7,948,976 B2 | 5/2011 | Arad et al. | |
| 8,149,708 B2 * | 4/2012 | Oz et al. | 370/235 |
| 8,218,546 B2 | 7/2012 | Opsasnick | |
| 2003/0223442 A1 * | 12/2003 | Huang et al. | 370/412 |

\* cited by examiner

*Primary Examiner* — Robert C Scheibel
*Assistant Examiner* — Mark A Mais

(57) ABSTRACT

In a method for processing packets, a storage region for a packet is determined based on a queue with which the packet is associated. The storage region includes a committed area reserved for storage of packets associated with the queue, and an area that is shared by multiple queues for packet storage. A first part of the packet is stored in the committed area, a second part is stored in the shared area, and both parts are accounted for. A network device for processing packets comprises a plurality of queues and a storage area including a committed area and a shared area. The network device further comprises a packet queuing engine configured to store a first part of a packet in the committed area, store a second part of the packet in the shared area, and account for the storage of the first and the second parts of the packet.

23 Claims, 6 Drawing Sheets

ENHANCED TAIL DROPPING IN A SWITCH

CROSS-REFERENCES TO RELATED APPLICATIONS

The present application claims the benefit of U.S. Provisional Application No. 61/301,776 entitled "Tail Dropping in a Switch," which was filed on Feb. 5, 2010, the entire disclosure of which is hereby incorporated by reference herein.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Packet processors perform various functions in communication networks, such as packet switching and packet routing. At least some of these functions require a packet processor to temporarily store a copy of a packet while various other processing is performed. If insufficient resources are available, the packet processor is unable to store the data packet and the packet may be dropped.

Different levels of service may be provided based upon properties of packets. In some scenarios, a packet processor assigns a higher level of service to packets representing interactive traffic than to packets representing bulk file transfers, for example. In other scenarios, the packet processor guarantees a specified bandwidth to some types of traffic and limits the bandwidth available to other types of traffic, for example.

SUMMARY

In an embodiment, a method of processing packets in a network includes determining, based on a queue with which a packet is associated, a storage region for storing the packet. The storage region includes a committed area and a shared area each of which is reserved or allocated for storage of packets associated with the queue. The method also includes storing a first part of the packet in the committed area and storing a second part of the packet in the shared area. The method further includes accounting for the first part of the packet stored in the committed area, and accounting for the second part of the packet stored in the shared area.

In another embodiment, a network device for processing packet comprises a plurality of queues and a storage resource associated with the plurality of queues. The storage resource includes a shared area and a plurality of committed areas. The network device further comprises a packet queuing engine configured to determine a particular committed area of the plurality of committed areas based on a queue with which a packet is associated, store a first part of the packet in the particular committed area, and store a second part of the packet in the at least a portion of the shared area. The packet queuing engine is also configured to account for the first part of the packet stored in the particular committed area, and account for the second part of the packet stored in the at least the portion of the shared area.

In yet another embodiment, a tangible, computer-readable storage medium comprises computer-executable instructions for use by a processor for processing packets. The computer-executable instructions include instructions for determining, based on a queue associated with a packet, a storage region for storing the packet, where the storage region includes a committed area and a shared area. The computer-executable instructions also include instructions for causing a first part of the packet to be stored in the committed area, causing a second part of the packet to be stored in the shared area, and accounting for storage of the first part of the packet and the second part of the packet. Additionally, the computer-executable instructions include instructions for removing the first part of the packet from the committed area, removing the second part of the packet from the shared area, and accounting for the removal of the first and the second parts of the packet.

DETAILED DESCRIPTION

Resources for storing packets in a packet processor include a plurality of storage regions that are allocated based on queues, in an embodiment. Each storage region includes a committed area to guarantee an amount of storage for a particular queue or a particular group of queues, and a shared area that provides shared storage for multiple queues and/or multiple groups of queues, in an embodiment. A particular storage region is identified for a packet, and includes a committed storage area and/or a shared storage area. Currently known techniques, referred to herein as "simple tail dropping," generally drop a packet if the entirety of the packet does not fit into the committed storage area and if the entirety of the packet does not fit into the shared storage area. However, with techniques, methods, systems and apparatuses of the present disclosure, generally referred to herein as "enhanced tail dropping," a packet queuing engine stores a first part of the packet in the committed area of the particular storage region if available storage space in the committed area exceeds a first threshold, and the packet queuing engine stores a second part or remainder of the packet in the shared area of the particular storage region if available storage space in the shared area exceeds a second threshold. In an embodiment of enhanced tail dropping, a committed area is reserved for storage of packets of a particular queue, and a shared area is reserved for storage of packets of more than one queue. Thus, with enhanced tail dropping, storage resources are used more efficiently as compared to simple tail dropping, at least in some embodiments and/or scenarios.

Figure 1:
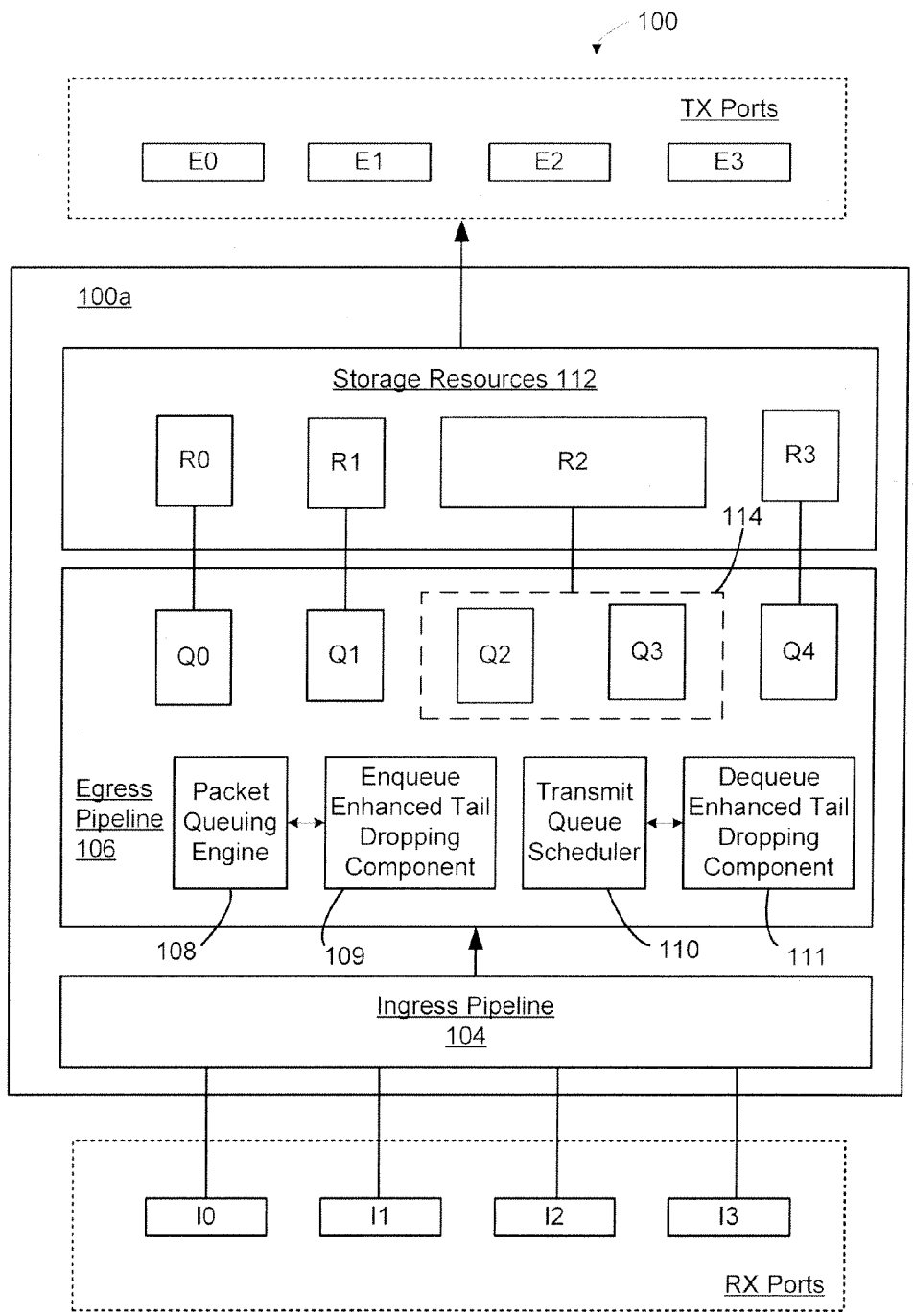
FIG. 1 is a high-level block diagram of a packet processor in accordance with an embodiment.

FIG. 1 is a high-level block diagram of an example network device 100, which may be a switch, a router, or other network device configured for forwarding, switching or routing packets. The network device 100 is typically connected into a network and processes packets for forwarding, switching or routing to other network devices. Accordingly, the network device 100 is referred to interchangeably herein as a "network device," a "switch," a "router," or a "network switch." The network device 100 includes a packet processor 100a configured to support enhanced tail dropping, in accordance with an embodiment. Packet processor 100a receives data packets at any of the ingress ports I0, I1, I2, I3. Packets received at the ingress ports are processed at various stages of an ingress pipeline 104. The ingress pipeline 104 sets or determines the values of various attributes associated with the data packet, in an embodiment. For example, one or more of a traffic class, a drop precedence value, and a priority are assigned to or determined for the data packet, in various embodiments.

A traffic class, as used herein, is a category of a type of packet traffic. In various embodiments, traffic classes are based on one or more of protocol, statistical analysis of packet travel attributes (e.g., byte frequencies, inter-arrival times, etc.), applications, source or destination address, etc. Different traffic classes are treated differently by the packet processor 100a, at least in some embodiments and/or scenarios. A drop precedence value, as used herein, indicates a relative indication of a probability that a packet will be dropped (for example, during times of congestion) as compared to packets of other drop precedence values. In one example, a higher drop precedence value indicates a higher probability of being dropped so that packets corresponding to more delay-sensitive applications should be assigned a lower drop precedence value than packets corresponding to less delay-sensitive applications. For instance, preference is given to more delay-sensitive video-streaming applications so that fewer packets in a video-stream are dropped or delayed.

Priority information is used, for example, to implement quality of service on a network. In an embodiment, a different priority is assigned to a packet or to a flow of which the packet is a part to differentiate between applications, delay sensitivity, and/or quality of service offerings, for example. For example, a network operator may guarantee to provide a customer with a specified amount of bandwidth for the customer's applications and may further agree to supply a certain quality of service based upon the type of traffic. To support differentiated services, packet processor 100a maintains one or more attributes such as a priority, a traffic class and a drop precedence value for each data packet. These values are set when the packet is received and are sometimes altered as the packet passes through the various processing stages, in an embodiment. In some embodiments, the packet processor supports eight traffic classes and three drop precedence values. In some embodiments, a priority of a packet is determined using a combination of other attributes, such as drop priority and type of traffic.

In some embodiments, traffic class, drop precedence, priority, and/or various other packet attributes are included as part of a QoS (Quality of Service) profile that is assigned to the data packet by various stages (not shown) of ingress pipeline 104. Packet processor 100a maintains attributes for each data packet received at an ingress port (also referred to herein as a receive (RX) port) I0, I1, I2, I3 and uses this information to schedule transmission of the packet at an egress port (also referred to herein as a transmit (TX) port) E0, E1, E2, E3. Although four ingress ports and four egress ports are illustrated in FIG. 1, the packet processor 100a includes different numbers of ingress ports (e.g., 1, 2, 3, 5, 6, etc.), different numbers of egress ports (e.g., 1, 2, 3, 5, 6, etc.), and the number of ingress ports is different than the number of egress ports, in other embodiments. Additionally, one or more ports each serve as both an ingress port and an egress port, in some embodiments. It is noted that in light of the teachings and disclosure herein, the configuration shown is for purposes of illustration only, and that many alternative configurations are possible and within the scope the present disclosure.

Figure 2:
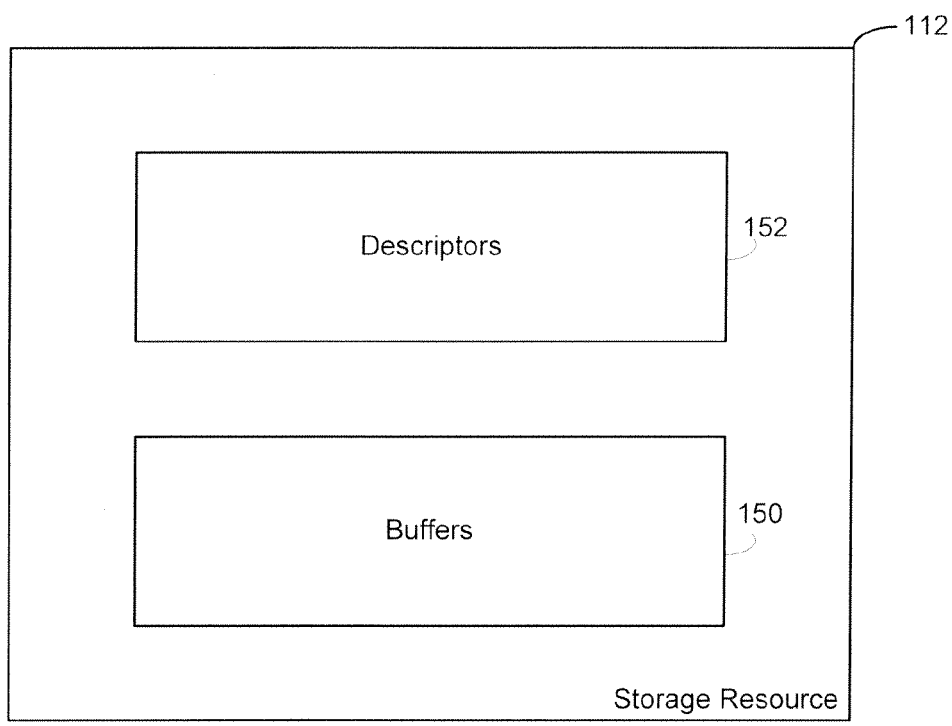
FIG. 2 is a diagram of storage resources of the packet processor of FIG. 1, according to an embodiment.

After ingress processing, the data packet enters an egress pipeline 106 and is scheduled for transmission at one or more egress ports E0, E1, E2, E3. Packet processor 100a includes storage resources 112, in an embodiment. FIG. 2 is a diagram of the storage resources 112, according to an embodiment. As shown in FIG. 2, the storage resources 112 include buffers 150 and descriptors 152. In an embodiment, each descriptor includes information associated with a packet, such as header information, attributes, etc. In some embodiments, fixed-size buffers are dynamically allocated to store a packet based upon the size of the data packet. Thus, a data packet that is one kilobyte in size might be stored in four 256 byte buffers. In one embodiment, the packet processor 100a includes storage for $8 \times 2^{10}$ descriptors and includes $8 \times 2^{10}$ buffers where each buffer can hold 512 bytes of data. In another embodiment, the packet processor 100a includes storage for $16 \times 2^{10}$ descriptors and includes $16 \times 2^{10}$ buffers where each buffer can hold 512 bytes of data. In yet another embodiment, the packet processor 100a includes storage for $6 \times 2^{10}$ descriptors and includes $6 \times 2^{10}$ buffers where each buffer can hold 256 bytes of data. In other embodiments, the packet processor 100a includes other suitable amounts of storage for descriptors and buffers.

The network device 100 is configured to perform enhanced tail dropping, in an exemplary embodiment. For brevity, enhanced tail dropping is described below as being performed for egress resource management of the network device 100. In some embodiments, however, enhanced tail dropping is additionally or alternatively performed for ingress resource management. In fact, enhanced tail dropping may be performed by the network device 100 for any resource management that corresponds to a set of queues.

In the packet processor 100a of the network device 100, the egress pipeline 106 includes a number of functional units (all of which are not shown for clarity) associated with egress packet processing. These functional units include, among others, a packet queuing engine 108 and a transmit queue scheduler 110. In an embodiment, packet queuing engine 108 is responsible for determining which packets are enqueued for subsequent transmission via TX ports E0, E1, E2 and E3 to the network, and transmit queue scheduler 110 implements one of several de-queuing algorithms that selects a stored packet for de-queuing and transmission via the TX ports E0, E1, E2 and E3. At certain times, egress pipeline 106 receives more packets for transmission than can be enqueued. In these situations, packet queuing engine 108, using at least the enhanced tail dropping component 109, decides which packets to store and which packets to drop from the system. Generally speaking, this determination is made based upon information about the data packet and information about current resource utilization. The information about current resource utilization is provided by the enqueue enhanced tail dropping component 109, in an example. Similarly, when a packet is selected for de-queuing and transmission by the transmit queue scheduler 110, the dequeue enhanced trail dropping component 111 updates the current resource utilization information, in an embodiment.

While the enqueue enhanced trail dropping component 109 and the dequeue enhanced tail dropping component 111 are illustrated in FIG. 1 as being included in and executed by the packet processor 100a, in some embodiments, one or both of the enqueue enhanced trail dropping component 109 or the dequeue enhanced tail dropping component 111 are included in and/or executed by another processor, such as by a central processing unit (CPU, not shown) in communicative connection with the packet processor 100a. In some cases, the CPU is programmable to include or execute instructions corresponding to one or both of the enqueue enhanced trail dropping component 109 and the dequeue enhanced tail dropping component 111.

Returning to FIG. 1, the packet processor 100a accesses or reads a threshold value and determines whether the threshold value, which is based upon system-wide resource utilization, has been exceeded, in an embodiment. For example, this threshold is based upon the total number of buffers used in the system or the total number of descriptors allocated, in some embodiments. In some embodiments, threshold values associated with buffers and descriptors are checked separately. If the current resource utilization exceeds a system-wide threshold value, the packet processor has insufficient resources to store the data packet and the packet is dropped.

If the packet processor has sufficient system-wide resources, the packet processor 100a allocates storage resources 112 for a particular packet based on transmit queues (e.g. Q0, Q1, Q2, Q3) to promote efficiency and to maintain quality of service, in an embodiment. Each TX queue services packets that are destined to be forwarded from the packet processor 100a via the egress ports E0, E1, E2, E3. Additionally, in some embodiments, each TX queue corresponds to particular values of one or more particular packet attributes, such as a particular traffic class or traffic type, a particular priority of packet or flow, a particular application corresponding to the packet or flow, a particular packet type, traffic that is operating at a same data rate, traffic that has a same drop priority, etc. In an embodiment, a particular queue does not correspond to a particular ingress port or group of ingress ports, or to a particular egress port or group of egress ports. That is, in an embodiment, TX queues are organized independently of ports. In an embodiment, the network packet processor 100a supports a total of eight traffic classes that are serviceable by any number of ports, and, correspondingly, the packet processor 100a includes eight queues, each of which corresponds to a different traffic class. In other embodiments, a number of traffic classes less than or greater than eight is supported.

To preserve clarity and brevity of illustration and discussion. FIG. 1 depicts five TX queues Q0, Q1, Q2, Q3 and Q4 in conjunction with the egress pipeline 106. However, any suitable number of TX queues service the egress pipeline 106. Furthermore, although the present application generally describes embodiments of enhanced tail dropping techniques with respect to the egress pipeline 106, in other embodiments, enhanced tail dropping techniques are utilized in the ingress pipeline 104 in a similar fashion additionally or alternatively. For example, any number of receive (RX) queues (not shown) service packets that are received via the ingress ports I0, I1, I2, I3, and are processed by a packet queuing engine (also not shown) in the ingress pipeline 104, in some embodiments. In these embodiments, similar to the TX queues Q0, Q1, Q2, Q3, and Q4, each RX queue services packets having particular values of one or more particular packet attributes, and at any time each RX queue services any number of ingress ports or queues packets destined for any number of egress ports. Still further, in some embodiments, enhanced tail dropping techniques are utilized for any suitable set of queues.

In some embodiments, at least a portion of the storage resources 112 are reserved or allocated for storage of packets associated with specific individual queues. For example, in FIG. 1, a first set of storage resources R0 is reserved, designated or allocated to store packets associated with Q0, a second set of storage resources R1 is reserved, designated or allocated to store packets associated with Q1, and a third set of storage resources R3 is designated or allocated to store packets associated with Q4. Thus, a respective portion R0, R1, R3 of the storage resources 112 is reserved or allocated for each queue Q0, Q1, Q4. In some embodiments, this reservation or allocation of storage resources to individual queues is performed on a per-queue basis. In one example, a queue-profile is associated with each queue that specifies, among other things, the amount of resources allocable to or reserved for the queue. In some embodiments, a profile is assigned to each queue selected from among multiple user-configurable profiles.

In some embodiments, at least a portion of the storage resources 112 is reserved, designated or allocated to store packets from groups of queues, such as from the group of queues 114 including Q2 and Q3. The group of queues 114 are designated to service packets with similar values for one or more common attributes such as a particular traffic class or traffic type, a priority of packet or flow, an application corresponding to the packet or flow, a packet type, traffic that is operating at a same data rate, traffic that has a same drop priority, etc. Of course, a group of queues is not limited to only two queues, but can include any suitable number of queues. In an exemplary embodiment, the packet processor 100a supports a total of eight traffic classes and, correspondingly, the packet processor 100a includes up to eight groups of queues, each of which corresponds to a different traffic class. Each of the groups of queues can include different numbers of individual queues.

Thus, in the embodiment illustrated by FIG. 1, at least a portion of the storage resources 112 are reserved or allocated for storing packets of one or more queues Q0-Q4. In some embodiments, resources that are reserved for or allocated to a particular queue or a particular group of queues are not available for storage of packets associated with other queues or other groups of queues. Similarly, in some embodiments, a particular queue or particular group of queues is prevented from exceeding its resource allocation and/or prevented from accessing resources allocated to or reserved for another group of queues.

In an embodiment, the packet processor 100a reserves, allocates or designates one or more portions of the storage resources 112 (e.g. R0-R3) for storage of packets associated with respective queues Q0-Q4. In another embodiment, a CPU (not shown) reserves, allocates or designates one or more portions of the storage resources R0-R3 for storage of packets associated with respective queues Q0-Q4. For instance, the CPU is programmed to execute instructions corresponding to reserving, allocating or designating one or more portions of the storage resources 112. In other embodiments, the packet processor 100a reserves, allocates or designates a first portion of the storage resources R0-R3, and the CPU reserves, allocates or designates a second portion of storage resources R0-R3.

Reservations or allocations of portions of storage resources 112 are indicated by respective parameters, in an embodiment, with each parameter corresponding to a threshold or a maximum size. In some cases, at least some of the parameters and their values are manually specified, automatically specified by the packet processor 100a, a CPU and/or some other suitable processor, or are some combination of manually and automatically specified. In some cases, the parameters are modifiable, either manually, automatically, or both manually and automatically.

In the embodiment illustrated by FIG. 1, while processing a packet, the packet processor 100a assigns one or more portions of the packet to be stored in one or more portions of the storage resources 112. In this embodiment, the single packet processor 100a illustrated in FIG. 1 employs two assignment strategies in combination: a first strategy directed to assignment based on individual queues (e.g., individual queues Q0, Q1 and Q4 are each allocated respective storage resources portions R0, R1, and R3), and a second strategy directed to assignment based on groups of queues (e.g., the group of queues 114 is allocated the portion R2 of the storage resources 112). In some embodiments, though, only one of i) the first strategy or ii) the second strategy is employed by the packet processor 100a. In some embodiments, other assignment strategies are additionally or alternatively employed by the packet processor 100a. In an embodiment, the enqueue enhanced tail dropping component 109 and the dequeue enhanced tail dropping component 111 of the packet processor 100a each employ at least a portion of the assignment strategies.

Figure 3:
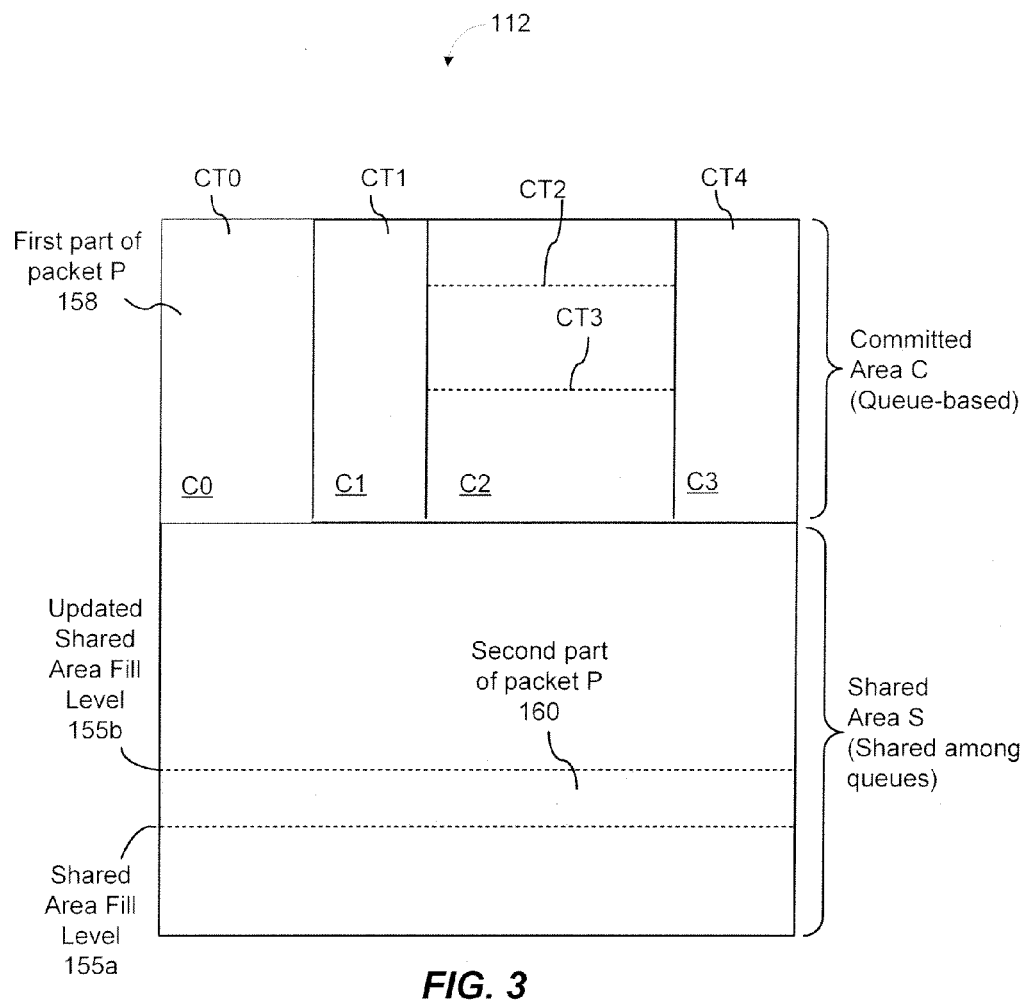
FIG. 3 is a diagram of an arrangement of the storage resources of FIG. 2 in accordance with an embodiment.

FIG. 3 shows an example arrangement of storage resources 112 according to an embodiment. FIG. 3 is discussed with simultaneous reference to FIG. 1. In an embodiment, the storage resources 112 shown in FIG. 3 are managed and accounted for by the enqueue enhanced tail dropping component 109 and the dequeue enhanced tail dropping component 111 of FIG. 1.

The storage resources 112 of FIG. 3 include a Committed Area C and a shared area S. The Committed Area C is further divided into committed subareas C0, C1, C2 and C3, respectively corresponding to queue Q0, queue Q1, the group of queues Q2 and Q3, and queue Q4, so that packets or portions of packets from each queue or group of queues are stored in a corresponding committed subarea. For example, packets from Q1 are stored in committed area C1, and packets from Q2 or Q3 are stored in C2. In effect, multiple committed areas C0, C1, C2, and C3 are defined, but in the discussion herein, C0, C1, C2, and C3 are referred to as "committed subareas" for sake of clarity. For each committed subarea, the packet processor 100a maintains, reads, or accesses at least one respective committed subarea threshold (e.g., CT0, CT1, CT2, CT3, or CT4) that indicates a maximum amount of packet data that is able to be stored in the respective committed subarea. In an embodiment, each committed area threshold corresponds to a guaranteed amount of space that is allocated or reserved in the committed area of the storage region (e.g., CT0, CT1, CT2, CT3 of FIG. 3) for packets associated with a respective queue. In some embodiments, the committed area threshold corresponds to a maximum size of the committed area of the storage region that is allocated or reserved for packets the respective queue. In other embodiments, different committed area thresholds for the storage region correspond to different attribute values, so that packets of a particular attribute value are guaranteed a subset of the committed area of the storage region allocated or reserved for packets of the queue. Examples of attributes and their associated values include a drop priority, a flow identification, a traffic level, or others such as previously discussed. The committed subarea threshold indicates, for example, a number of buffers 150, a number of descriptors 152, a number of bytes, or any suitable measure corresponding to data storage amounts.

Typically, a committed subarea threshold corresponds to a maximum size of the committed subarea (e.g. example thresholds CT0, CT1, CT4) but this is not required. For example, committed subarea C2 corresponding to the group of queues Q2 and Q3 includes two thresholds CT2 and CT3, each corresponding to a different flow priority. Packets corresponding to a flow of a lower priority are allocated a lesser amount of space within subarea C2 and correspond to a lower threshold CT3. Packets corresponding to a flow of a higher priority are allocated a greater amount of space within subarea C2, and correspond to a higher threshold CT2. Further, in this example, packets corresponding to a flow of an even higher priority do not correspond to any threshold at all and are allowed to occupy an available space of any size in C2.

Of course, thresholds within a committed subarea need not correspond to only flow priority. Other characteristics or attributes of packets or their flow influence threshold levels, in other embodiments. In some embodiments, different threshold levels correspond to different applications so that packet traffic for a real-time critical application served by a queue is designated more space in a committed subarea as compared to packet traffic for an application that is not as real-time critical, for example. Indeed, one or more thresholds within a committed area may correspond to any suitable number of characteristics or attributes associated with packets and/or their flow, such as traffic type, drop priority, flow identification, etc. Furthermore, for each particular committed subarea, any suitable number of desired thresholds is definable at any desired threshold level. In some embodiments, the committed subarea thresholds are adjustable.

When a queue has exhausted the available storage space in its corresponding committed subarea (e.g. the occupancy of the committed subarea has reached its corresponding threshold), a next packet or next portion of a packet from the queue is stored in the shared area S, if space is available. The shared area S stores packets or portions of packets corresponding to multiple queues. In one illustrative example, the shared area S stores an entire packet corresponding to Q0, a portion of packet corresponding to Q2, and a different portion of a different packet corresponding to Q3. The packet processor maintains, reads, or accesses a shared area fill level indicator or counter (represented in FIG. 3 at different instances in time by references 155a and 155b) to indicate an aggregate occupancy level of the shared area S by currently enqueued packets or portions thereof from one or more queues or group of queues. Packets or portions thereof corresponding to any of the queues Q0, Q1, Q2, Q3, or Q4 are stored by the packet processor 100a in shared area S, if shared area S has sufficient space. Thus, referring back to FIG. 1, portion R0 of the storage area 112 designated for Q0 includes committed subarea C0 and shared area S, portion R1 designated for Q1 includes C1 and S, portion R2 designated for Q2 and Q3 includes C2 and S, and portion R3 designated for Q4 includes C3 and S.

In an embodiment, a packet can be distributively stored across a designated committed subarea and a designated shared area. For example, FIG. 3 shows a data packet P (contents of which are represented by the diagonal hatching) corresponding to queue Q0. A first part 158 of packet P is stored in the committed subarea C0 corresponding to Q0, up to the threshold CT0. A second or remaining part 160 of packet P is stored in the shared area S, and upon the storage of the second part 160 of the packet P, the shared fill level indicator is updated from a previous level 155a to an updated level 155b.

The distribution of a single packet across committed and shared areas provides benefits over prior techniques, and particularly in maximizing the efficiency of storage resources, at least in some embodiments and/or scenarios. Currently known techniques generally drop a packet if the entirety of the packet does not fit into a committed storage area for a queue with which the packet is associated and if the entirety of the packet does not fit into a shared area. In the embodiment of FIG. 1, however, storage of resources are more efficiently utilized as some portions of a packet are stored in a committed storage area and other portions of the same packet are stored in shared areas. Furthermore, as the resource pool 112 is aggregated on a queue basis and shared over potentially multiple ports, storage resources 112 are more effectively globally utilized over techniques that segregate holding resources primarily based on ports, at least in some embodiments and/or scenarios. For example, resources are controllably shared across ports or groups of ports, in an embodiment.

Figure 4:
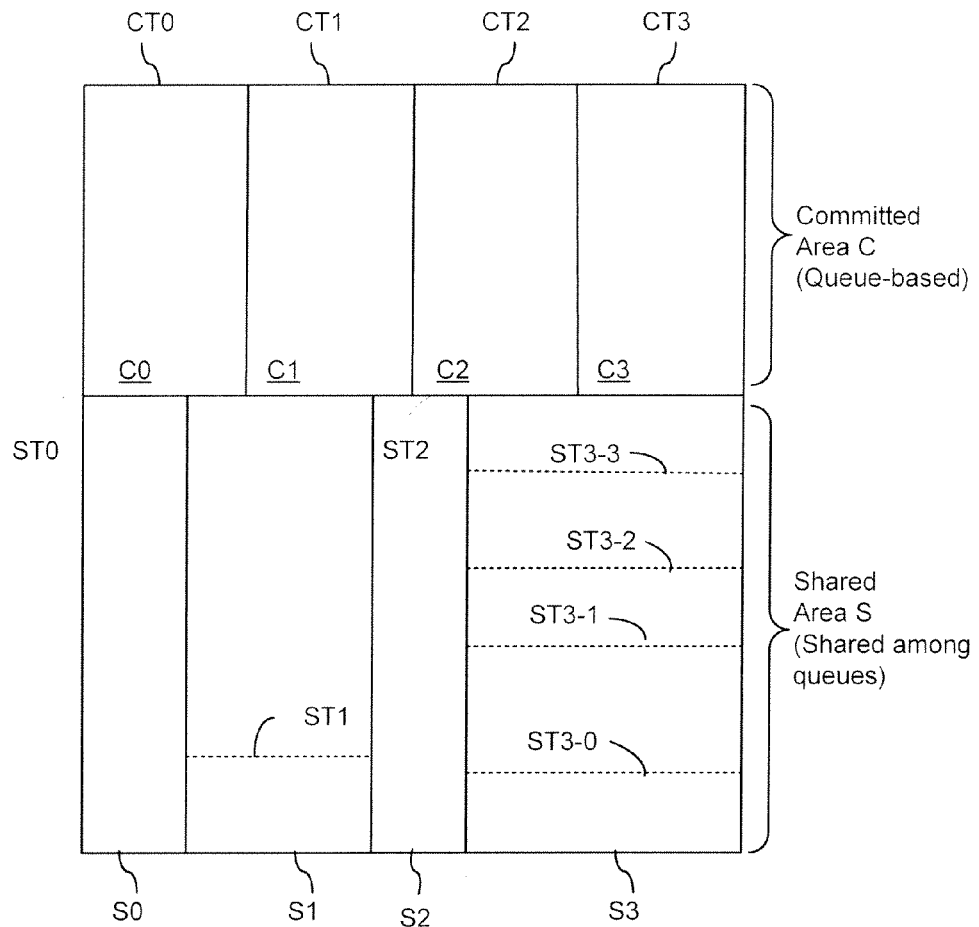
FIG. 4 is a diagram of another arrangement of the storage resources of FIG. 2 in accordance with another embodiment.

FIG. 4 illustrates another example allocation of the resource area 112. FIG. 4 is discussed with simultaneous reference to FIG. 1. In an embodiment, the storage resources 112 shown in FIG. 4 are managed by the enqueue enhanced tail dropping component 109 and the dequeue enhanced tail dropping component 111 of FIG. 1, although similar to as previously discussed, the storage resources 112 may be managed by one or more other suitable processors in communicative connection with the packet processor 100a.

In the embodiment illustrated in FIG. 4, similar to FIG. 3, the committed area C is subdivided into committed subareas C0, C1, C2, C3 corresponding to storage of packets associated with queue Q0, queue Q1, the group of queues Q2 and Q3, and queue Q4, respectively. In FIG. 4, however, the shared area S is also subdivided into shared subareas S0, S1, S2, and S3. In effect, multiple shared areas S0, S1, S2, and S3 are defined, but for the discussion herein, S0, S2, S3 and S4 are referred to as "shared subareas" for clarity's sake. The subdivision of the shared area S (e.g., the definition of the multiple shared areas S0, S1, S2, and S3) is based on a suitable number of characteristics or factors, as described below.

In some embodiments, one or more shared subareas are designated as storage for packets associated with a specific queue or with a specific group of queues. In one example, S0 corresponds to Q0, S1 corresponds to Q1, S3 corresponds to the group of queues Q2 and Q3, and no shared subarea of S corresponds to Q4. Thus, some queues or groups of queues (e.g., Q0, Q2 and the group Q2 and Q3) are each designated a shared subarea, while other queues or groups of queues (e.g., Q4) are designated the entire shared area S. In another example, one or more shared subareas are each designated for multiple queues or multiple groups of queues. e.g. shared subarea S1 is designated to store packets from Q0 and to store packets from Q4. In another example, each queue or group of queues is designated its own exclusive shared subarea. Other examples of designating shared subareas based on queues or groups of queues are alternatively or additionally possible.

In some embodiments, shared subareas correspond to different priorities. In one example, each shared subarea corresponds to a different priority, e.g. S0 corresponds to priority 0, S1 corresponds to priority 1, S2 corresponds to priority 2, and S3 corresponds to priority 3. Thus, a first packet corresponding to Q1 and to a priority of 3 and is designated to committed subarea C1 and to shared subarea S3. A second packet corresponding to Q2 and to a priority of 0 is designated to committed subarea C2 and shared subarea S0. In another example, one or more shared subareas correspond to multiple priorities, e.g. shared subarea S4 corresponds to priorities 5 and 6. In yet another embodiment, a particular shared subarea corresponds to only one priority, and another shared area corresponds to more than one priority. Note that a particular priority need not be designated a particular subarea at all. For example, packets corresponding to a highest priority (e.g., emergency communications, etc.) are stored in any shared subarea S0, S1, S2, S3, in an embodiment. Of course, other embodiments of designating shared subareas based on priority are contemplated.

In some embodiments, shared subareas correspond to different groups of ports serviced by the queue or the group of queues. While packets corresponding to a queue or group of queues arriving on different ports all share a particular committed subarea, shared subareas are segregated (or sizes of shared subareas may be designated) according to characteristics or attributes corresponding to groups of ports, in an embodiment. In one scenario, groups of ports are segregated based on the networks to which the ports are connected. For example, a first group of ports is customer-facing and is designated to move customer packet traffic quickly into and out of the packet processor in spite of a slower customer data rate. A second group of ports is network-facing and enjoys a faster data rate. In this example, the customer-facing group of ports is designated a larger shared subarea (e.g. S3) and the network-facing group of ports is designated a smaller shared subarea (e.g., S2). In another embodiment, a first group of ports correspond to applications that require faster processing (e.g. delay-sensitive applications) and are designated to larger shared areas (e.g. S1 and/or S3), and a second group of ports corresponding to applications that are more delay-tolerant are designated to smaller shared areas (e.g. S0 and/or S2). Of course, in other embodiments, other ways of designating shared subareas based on groups of ports are utilized alternatively or additionally.

In FIG. 4, one or more thresholds for each shared subarea are defined in a manner similar to the committed subarea thresholds discussed with reference to FIG. 3. In an embodiment, values of the one or more thresholds are stored in or accessible by the packet processor 100a or by any suitable processor in communicative connection with the packet processor 100a. In an example, shared subarea threshold ST0 and shared subarea threshold ST2 are defined to be the maximum size of shared subarea S0 and shared subarea S2, respectively. Shared subarea threshold ST1 is defined for shared subarea S1 but is less than the size of S1. Shared subarea thresholds ST3-0, ST3-1, ST3-2 and ST3-3 are defined for shared subarea S3. In some embodiments, the shared subarea thresholds are defined based on values of any suitable packet or traffic attributes or characteristics or combinations thereof, such as flow priority, traffic type, drop priority, flow identification, group of ports, applications, etc. Furthermore, for each particular shared subarea, any suitable number of desired thresholds is defined at any suitable and desired threshold levels. The shared subarea thresholds are adjustable, in an embodiment.

By using values of shared subarea thresholds, the packet processor 100a effectively limits a size of a queue or the maximum number of storage resources that a queue is allowed to consume, regardless of available resources in a shared pool. With currently known techniques, on the other hand, it is possible for a packet to occupy an excessively large portion of a shared storage resource which results in delays for any subsequent packets, including those that are more delay-sensitive or that have a higher priority. With techniques disclosed herein, however, quality of service (QoS) for priority or delay-sensitive traffic is improved over currently known techniques as lesser priority or delay-sensitive traffic is not allowed to occupy an excessively large space in the shared area, at least in some embodiments and scenarios.

Furthermore, within a particular queue, different types of packet attributes can be allocated or reserved different amounts of resources by using shared subarea thresholds, at least in some embodiments and scenarios. For example, if packets from Q1 with traffic class 3 are allocated storage areas C1 and S3, any packets in Q1 of traffic class 3 and priority 0 are allowed to occupy up to ST3-0, while packets in Q1 of traffic class 3 and priority 3 are allowed to occupy up to ST3-3. In this manner, control of delivery and delay between differently attributed packets is fine-tuned and controllable within the packet processor 100a, in an embodiment.

In the examples of FIGS. 3 and 4, a given queue is guaranteed a committed subarea for packet storage and may be further guaranteed a portion of a shared area, in some embodiments. In this manner, packet traffic that is deemed to be higher priority or more time-sensitive is given preference over lower priority or less-time sensitive traffic. However, as the lower priority or less-time sensitive traffic has its own guaranteed committed subarea (and a potential portion of the shared area), it is not totally subservient to the higher priority or more time-sensitive traffic. The thresholds of the committed area, committed subareas, shared area and shared areas are adjustable to respond to desired or changing traffic characteristics, in an embodiment.

Figure 5:
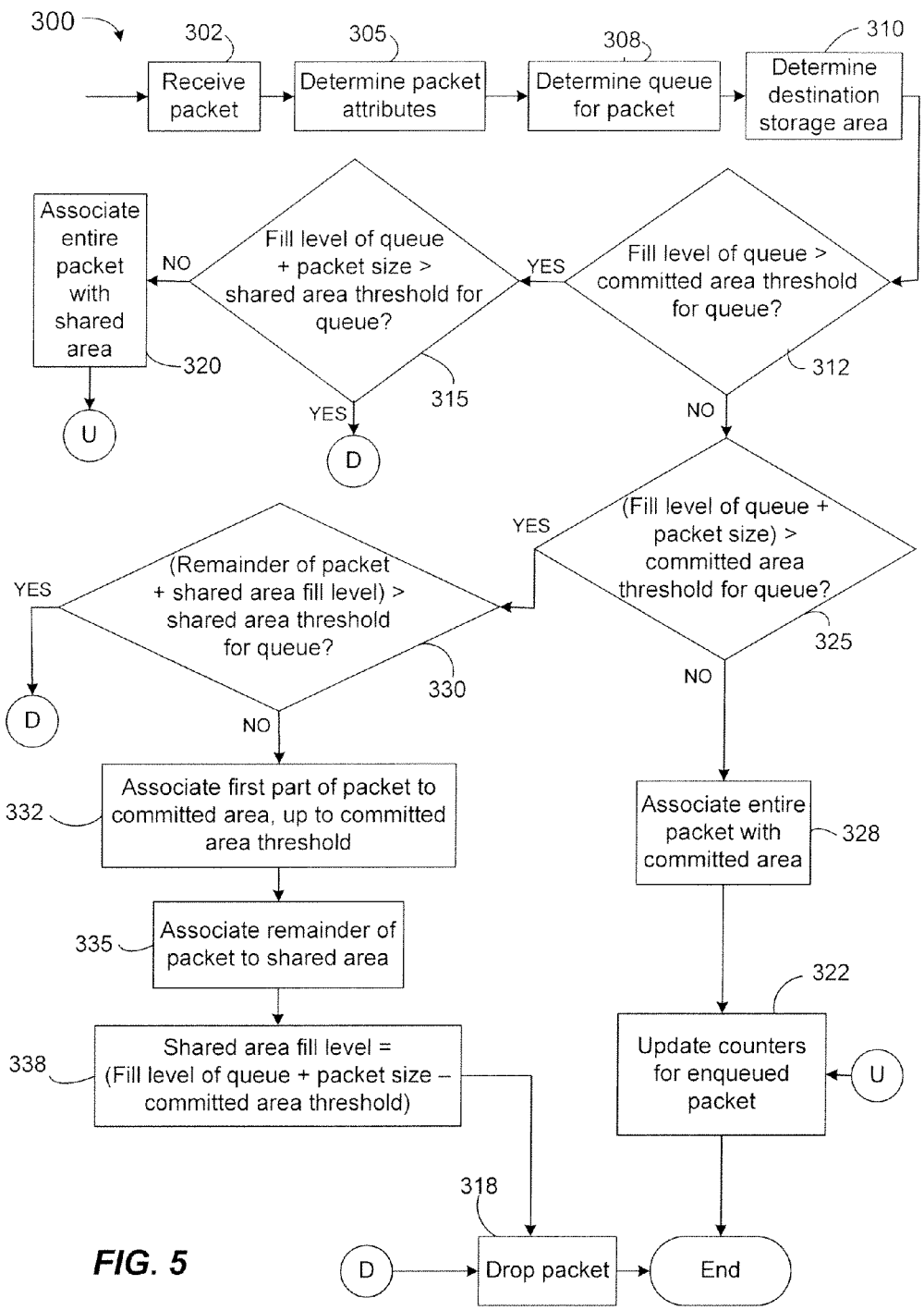
FIG. 5 is a flow diagram of a method for allocating resources during packet enqueuing according to an embodiment.

FIG. 5 is a flow diagram of an example method 300 performed by a packet processor to assign resources to a data packet during packet enqueuing into a TX queue or into an RX queue, according to an embodiment. For clarity, the method 300 is described below as being implemented by the packet processor 100a of FIG. 1. In other embodiments, however, one or more portions of the method 300 are implemented by another suitable packet processor or by another suitable processor such as a CPU. Furthermore, in some embodiments, one or more portions of the method 300 are implemented by more than one packet processor or suitable processor.

The flow diagram 300 includes acts corresponding to accounting that is performed when resources are allocated. In an embodiment, at least some of the acts of the flow diagram 300 are executed by the packet queuing engine 108, and are executed in conjunction with an arrangement of the storage resources 112 such as shown in FIGS. 3 and 4. In an embodiment, at least some of the acts of the method 300 are executed by the enqueue enhanced tail dropping component 109.

At block 302, the packet processor receives a packet. The packet is received at a stage in an ingress pipeline or in an egress pipeline after one or more processing operations has been performed on the data packet, in an embodiment.

At block 305, the packet processor determines attributes corresponding to the packet, such as one or more of packet size, quality of service (QoS) information, destination port information for the packet, identities of a sender or a receiver of the packet, a corresponding flow identification, a data rate, etc. The size of the packet P includes a length of the packet measured in, for example, a number of buffers (e.g., buffers 150) required to store the packet, a number of descriptors (e.g., descriptors 152) with which the packet is associated, a number of bytes, or any suitable measure corresponding to a size of the packet. The QoS information includes information such as a traffic class and a drop precedence value, and the QoS information is included as part of a QoS profile of the packet, in an embodiment, for example. The destination port specifies a particular egress port, in an embodiment.

At block 308, the packet processor uses at least a part of the information from block 305 to determine a queue with which the packet is to be associated. Each queue services packets having particular values of one or more particular packet attributes.

At block 310, the packet processor determines a storage region for the data packet based on the queue to which the packet is associated. For example, the packet processor determines the storage region based on the queue that was determined at block 308, or the packet processor determines the storage region based on a group of queues of which the queue that was determined at block 308 is a part, in some embodiments. In some embodiments, the packet processor determines the storage area at least partly based on the information determined at block 305. In some embodiments, the packet processor 100a determines a committed area or subarea and determines a shared area or subarea.

After the packet processor determines a storage region for the packet, the packet processor decides, based on the packet length of the packet P and various counters or indicators, whether to (1) assign or allocate resources to the packet entirely from the committed area of the storage region, (2) assign or allocate resources to the packet entirely from the shared area of the storage region, (3) assign or allocate resources to the packet from both the committed and the shared areas of the storage region, or (4) drop the data packet. The process of assigning or allocating resources in options (1), (2) and (3) include assigning a collection of one or more buffers to store the packet while it waits to be transmitted and/or involves assigning one or more descriptors associated with the data packet in the buffers (e.g. buffers 150 and descriptors 152), in an embodiment. In some embodiments, these resources are organized as linked-lists.

At block 312, the packet processor determines if a fill level of the queue is greater than a committed area threshold for the queue. The term "fill level" of the determined queue or "queue fill level," as used herein, refers to a measure of an amount of packet data currently stored in or associated with the determined queue, e.g., an occupancy level of the queue. As such, the packet processor 100a maintains a counter or an indicator corresponding to the queue fill level (e.g., a "queue fill level counter" or a "queue fill level indicator") to account for a current amount of packet data associated with the queue. The packet data corresponds to data received from or destined for one or more ports, and is measured, for example, in a number of buffers, a number of descriptors, a number of bytes, or any suitable measure, in an embodiment. For example, referring to the embodiments illustrated in FIGS. 3 and 4, a fill level of Q1 corresponds to a total amount of packet data currently stored in C1 and S, and a fill level of Q2 corresponds to a total amount of packet data corresponding to Q2 that is currently stored in C2 and S.

If, at block 312, the current fill level of the queue is determined to be greater than the committed area threshold for the queue, the reserved committed resources of the queue are already fully occupied by previous packets and the queue is not able to accommodate the newly received data packet. Accordingly, the packet processor 100a forgoes storing any portion of the packet in the respective committed area, and determines whether or not the data packet is able to be accommodated by the shared area of the storage region. In particular, at a block 315, the packet processor determines if the sum of the fill level of the queue and the packet size P is greater than a shared area threshold corresponding to the queue. Similar to the committed area threshold for the queue, the shared area threshold corresponds to a maximum size of the shared area of the storage region allocated or reserved for the queue (e.g., ST0, ST2 of FIG. 4) in an embodiment, but in other embodiments, different shared area thresholds correspond to different attributes or characteristics of the packet or its associated flow (e.g., ST1, ST3-0, ST3-1, ST3-2 and ST3-3), so that differently attributed packets are guaranteed a subset of the shared area of the storage region allocated for the queue or group of queues.

If, at block 315, the sum of the current fill level of the queue and the data packet size P is greater than the shared area threshold, this indicates that the shared area is fully occupied by previous packets and is not able to accommodate the newly received data packet. Accordingly, the packet processor forgoes storing any portion of the packet in the shared area and drops the data packet (block 318). If the sum of the fill level of the queue and the data packet size P is less than or equal to the shared area threshold, the shared area has sufficient space to accommodate the entirety of newly received data packet. Thus, at a block 320, the packet processor associates the entire packet with the shared area. At a block 322, as a result of the storage of the packet data and its corresponding enqueuing, relevant counters or indicators are updated based on the association of the entirety of the packet with the shared area. For example, the current fill level of the queue is incremented by the size of the packet P, and a current fill level of the shared area is incremented by the size of the packet P.

Returning to the block 312, if the packet processor determines that the current fill level of the queue is less than or equal to the committed area threshold for the queue, the packet processor determines whether the entire packet is able to be accommodated by the committed area. In particular, the packet processor determines, at block 325, if the sum of the fill level of the queue and the packet size P is greater than the committed area threshold corresponding to the queue. If the committed area is able to accommodate the entire data packet, at block 328 the packet processor associates or assigns the entirety of the packet with the committed area, and at block 322, relevant counters are updated based on the association or assignment of the packet with the committed area. For example, the current fill level of the queue is incremented by the size of the packet (P).

If, at block 325, the sum of the current fill level of the queue and the data packet size P is greater than the committed area threshold, the committed area is only able to accommodate a portion of the data packet. Thus, at block 330, the packet processor determines if a remainder of the packet (e.g., a portion of the packet that is not stored in the committed area) plus the shared area fill level is greater than a shared area threshold corresponding to the queue. In effect, the packet processor answers the question "If a first part of the packet (up to the committed area threshold) was associated with the committed area, would the second part of the packet (e.g., a remainder of the packet that is not associated with the committed area) fit into the available space in the shared area?" If the remainder would not fit into the available space of the shared area, the packet is dropped at block 318.

If, as determined at block 330, the remainder would fit into the available space of the shared area, at block 332 the packet processor associates or assigns the first part of the packet to the committed area (up to the committed area threshold), and at block 335 the packet processor associates or assigns the second part of the packet with the shared area. At block 338, the packet processor determines an updated shared area fill level by subtracting the committed area threshold from a sum of the current fill level of the queue and the packet size P. Finally, relevant counters or indicators, such as the fill level of the queue, are updated at block 322. For example, the fill level of the queue is updated by the packet size P.

The embodiment of the method 300 shown in FIG. 5 illustrates determining whether there is sufficient overall space to accommodate the packet during various points throughout the flow 300. For example, at block 315 the packet processor determines whether the entire data packet fits into available space of the shared area, and at block 330 the method determines whether or not the second part of the data packet fits into available space of the shared area. In some embodiments, however, an overall determination of whether or not there are sufficient resources (in the committed area, the shared area, or split across both committed and shared areas) to store an entire packet is made prior to the initiation of the flow 300. If there is not sufficient overall space across the committed and the shared areas, the packet is dropped prior to the execution of the flow 300. In these embodiments, the blocks 315 and 330 are omitted from the flow 300.

Figure 6:
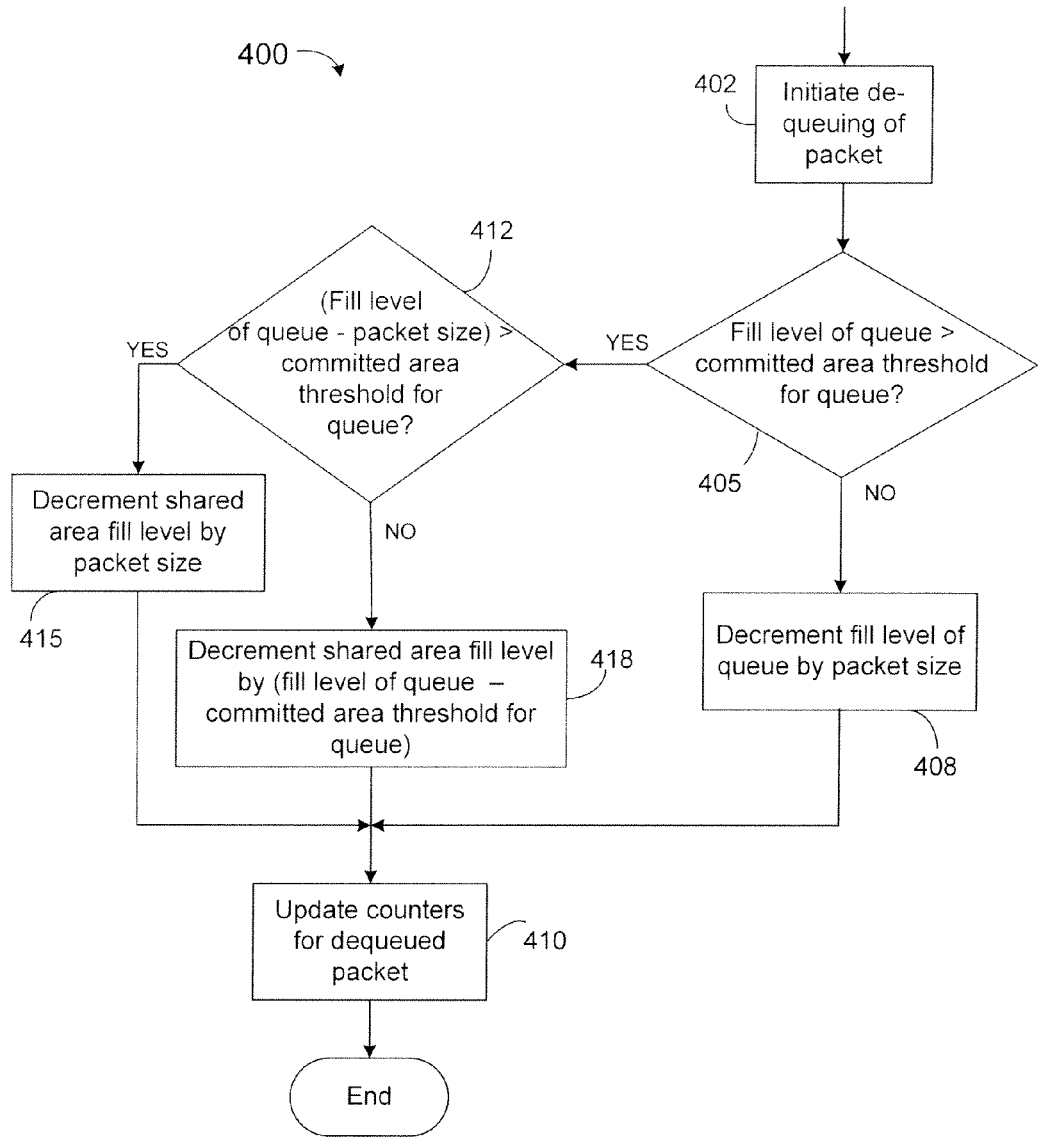
FIG. 6 is a flow diagram of a method for de-allocating resources during packet de-queuing according to an embodiment.

FIG. 6 is a flow diagram of another example method 400 performed by a packet processor to de-allocate or free up previously assigned resources for a packet during packet de-queuing from a TX queue or from an RX queue, according to an embodiment. The method 400 includes acts corresponding to accounting that is performed when resources are de-allocated. For clarity, the acts of the method 400 are described below as being executed by a packet processor such as the packet processor 100a of FIG. 1 in conjunction with an arrangement of storage resources such shown in FIGS. 3 and 4. In some embodiments, however, the method 400 is implemented by another suitable packet processor or by another processor such as a CPU, and in some embodiments, the method 400 is implemented by more than one suitable packet processor and/or other type of processor.

At block 402, the packet processor 100a initiates a de-queuing of a packet. For example, the packet processor 100a initiates the de-queuing of the packet in preparation for transmitting the packet from the packet processor 100a via one of the ports E0, E1, E2, E3 to a customer or to a network.

At block 405, the packet processor 100a determines whether the fill level of the queue corresponding to the packet is greater than a committed area threshold for the queue. The term "fill level" of the determined queue, as previously discussed, refers to a measure of a total amount of packet data from one or more ports that is currently associated with the determined queue. For example, referring to the embodiments illustrated in FIGS. 3 and 4, a fill level of Q1 corresponds to an amount of packet data stored in C1 and S, and a fill level of Q2 corresponds to an amount of packet data corresponding to Q2 that is stored in C2 and S. The committed area threshold, as previously discussed, corresponds to a guaranteed amount of space that is allocated for the determined queue in the committed area of the storage region (e.g. CT0, CT1, CT2, CT3 of FIG. 3 and CT0, CT1, CT2, CT3, CT4 of FIG. 4). If the fill level of the queue is less than or equal to the committed area threshold, this indicates that the entire packet is presently stored in the committed area, in an embodiment. Accordingly, as the packet is de-queued and sent for egress from the packet processor 100a, the fill level of the queue is decremented by the packet size 408, and other counters or indicators corresponding to the de-queued packet are updated 410.

If the fill level of the queue corresponding to the packet is determined at block 405 to be less than or equal to the committed threshold for the queue, this indicates that at least some portion of the packet is presently stored in the shared area. At block 412, the packet processor 100a determines whether the difference between the fill level of the queue and the packet size is greater than the committed area threshold for the queue. If so, this indicates that the entire packet is presently stored in the shared area. Accordingly, as the packet is de-queued and sent for egress from the packet processor 100a, the shared area fill level is decremented by the packet size 415, and other counters or indicators corresponding to the de-queued packet are updated 410.

If the difference between the fill level of the queue and the packet size is determined at block 312 to be less than or equal to the committed area threshold for the queue, then a portion of the packet is presently stored in the committed area, and another portion of the packet is presently stored in the shared area. Accordingly, at block 418, as the packet is de-queued and sent for egress from the packet processor 100a, the shared area fill level is decremented by the difference between the fill level of the queue and the committed area threshold for the queue. Other counters or indicators corresponding to the de-queued packet are updated accordingly at block 410.

In some embodiments of the techniques described above, the memory required for counters or indicators is greatly decreased over presently known techniques. In fact, in some embodiments, only two counters or indicators are used for each queue-one counter or indicator per queue (or per group of queues), and one counter or indicator per shared area. In just one example, the counter or indicator per queue (or per group of queues) corresponds to a fill level of the queue (or group of queues), and the counter or indicator per shared area corresponds to a shared area fill level, such as described with respect to FIGS. 3 and 4 above. Of particular note, no counter that directly accounts for the resources being used by committed storage areas (e.g. a fill level of a committed area or a committed subarea) is required, in some embodiments. In other embodiments, counters for committed areas and/or subareas are utilized. Additional counter memory savings are realized by using one counter or indicator corresponding to a shared area fill level of a particular shared area across all queues that utilize the particular shared area, in an embodiment.

In some embodiments, techniques such as described above are used in conjunction with currently known techniques or other suitable techniques, so that enhanced tail dropping is used in conjunction with simple tail dropping, for example. In an embodiment of the packet processor 100a, the enqueue enhanced tail dropping component 109 and the dequeue enhanced tail dropping component 111 operate in conjunction with currently known simple tail dropping components that allocate entire packets to either committed or shared storage areas, and/or that allocate packets on a port basis (not shown). For example, the simple tail dropping components are used by the packet processor 100a when communicating with legacy switches (e.g. to support backwards compatibility), and the enqueue enhanced tail dropping component 109 and the dequeue enhanced tail dropping component 111 are used by the packet processor 100a when communicating with non-legacy switches.

While the principles of the disclosure have been described above in connection with specific apparatuses and methods, it is to be clearly understood that this description is made only by way of example and not as limitation on the scope of the invention. Additionally, at least some of the various blocks, operations, and techniques described above may be implemented in hardware, a processor or computer executing firmware and/or software instructions, or any combination thereof. When implemented utilizing a processor executing software or firmware instructions, the executable software or firmware instructions may be stored in any tangible, computer readable or machine readable memory such as on a magnetic disk, an optical disk, or other tangible storage medium, in a RAM or ROM or flash memory, processor, hard disk drive, optical disk drive, tape drive, etc. The software or firmware instructions may include computer readable or machine readable instructions stored on a memory of another one or more computer readable or machine readable storage medium that, when executed by the processor, cause the processor to perform various acts. When implemented in hardware, the hardware may comprise one or more of discrete components, an integrated circuit, an application-specific integrated circuit, etc.

What is claimed is:

1. A method of processing packets in a network, the method comprising:
 allocating, within a committed area of storage resources, a first committed subarea to store packets corresponding to a first queue and not to store packets corresponding to other queues;
 allocating within a shared area of the storage resources, a plurality of shared subareas, including a first shared subarea, the first shared subarea to store packets corresponding to i) at least one of a first traffic type or a first priority, and ii) multiple queues among a plurality of queues, the multiple queues including the first queue, wherein the first shared subarea does not overlap with the first committed subarea;
 determining that a first packet corresponds to the first queue;
 determining that the first packet corresponds to the at least one of the first traffic type or the first priority;
 determining, based on i) determining that the first packet corresponds to the first queue, and ii) determining that the first packet corresponds to the at least one of the first traffic type or first priority, a storage region for storing the first packet, the storage region including i) the first committed subarea and ii) the first shared subarea;
 storing a first part of the first packet in the first committed subarea;
 storing a second part of the first packet in the first shared subarea;
 accounting for the first part of the first packet stored in the committed area; and
 accounting for the second part of the first packet stored in the shared area.

2. The method of claim 1, further comprising:
 determining the first part of the packet based on a queue fill level indicator corresponding to an occupancy level of the first queue, the occupancy level of the first queue corresponding to an amount of resources occupied by packets corresponding to the first queue, and
 determining the second part of the packet based on a shared area fill level indicator corresponding to an occupancy level of the first shared subarea, the occupancy level of the first shared subarea corresponding to an amount of resources occupied by packets corresponding to the first shared subarea.

3. The method of claim 2, wherein determining the first part of the packet based on the queue fill level indicator and determining the second part of the packet based on the shared area fill level indicator comprises determining the first part of the packet and the second part of the packet based on only two indicators, the only two indicators being the queue fill level indicator and the shared area fill level indicator.

4. The method of claim 2, wherein:
 accounting for the first part of the packet stored in the committed area comprises incrementing, after storing the first part of the packet in the first committed subarea, a value of the queue fill level indicator based on a size of the first part of the packet; and
 accounting for the second part of the packet stored in the first shared subarea comprises incrementing, after storing the second part of the packet in the first shared subarea, a value of the shared area fill level indicator based on a size of the second part of the packet.

5. The method of claim 2, wherein:
 when a sum of a size of the packet and a value of the queue fill level indicator is less than or equal to a committed area threshold corresponding to the first queue:
  storing the first part of the packet in the first committed subarea comprises storing an entirety of the packet in the committed area, and
  the method further comprises forgoing storing any part of the packet in the first shared subarea;

when the value of the queue fill level indicator is greater than the committed area threshold corresponding to the first queue:
  storing the second part of the packet in the first shared subarea comprises storing the entirety of the packet in the first shared subarea, and
  the method further comprises forgoing storing any part of the packet in the committed area; and
when the value of the queue fill level indicator is less than or equal to the committed area threshold corresponding to the first queue, and when the sum of the size of the packet and the value of the queue fill level indicator is greater than the committed area threshold, the method further comprises:
  determining the first part of the packet to have a size so that a sum of the size of the first part of the packet and the value of the queue fill level indicator is equivalent to the committed area threshold; and
  determining the second part of the packet to be a remainder of the packet.

6. The method of claim 5, further comprising dropping the packet when the second part of the packet has a size such that a sum of the size of the second part of the packet and the value of the shared area fill level indicator is greater than a shared area threshold corresponding to the first queue.

7. The method of claim 6, wherein:
the shared area threshold is a first shared area threshold corresponding to the first shared subarea and corresponding to the first queue, and the method further comprises:
storing, in another committed subarea, a first part of another packet corresponding to another queue and accounting for the first part of the another packet;
storing, in the shared area, a second part of the another packet based on a second shared area threshold corresponding to the another queue and accounting for the second part of the another packet,
wherein the second shared area threshold is different than the first shared area threshold.

8. The method of claim 2,
further comprising de-queuing the packet from the first committed subarea and from the first shared subarea, including removing the first part of the packet from the first committed subarea and removing the second part of the packet from the first shared subarea; and
wherein:
when a value of the queue fill level indicator is greater than a committed area threshold corresponding to the first queue, and if a difference between the value of the queue fill level indicator and a size of the packet is greater than the committed area threshold, accounting for the first and the second parts of the packet comprises decrementing a value of the shared area fill level indicator based on the size of the packet;
when the value of the queue fill level indicator is greater than the committed area threshold corresponding to the first queue, and if the difference between the value of the queue fill level indicator and the size of the packet is less than or equal to the committed area threshold, accounting for the first and the second parts of the packet comprises decrementing the value of the shared area fill level indicator based on a difference between the value of the queue fill level indicator and the committed area threshold corresponding to the queue; and
when the value of the queue fill level indicator is less than or equal to the committed area threshold corresponding to the queue, accounting for the first and the second parts of the packet comprises decrementing the value of the queue fill level indicator based on the size of the packet.

9. The method of claim 1, further comprising:
storing a second part of a second packet in a second shared subarea of the shared area, the second shared subarea corresponding to at least one of a second traffic type corresponding to the second packet, a second priority corresponding to the second packet, or a second group of ports corresponding to the second packet.

10. The method of claim 1, further comprising determining whether there is enough space in the first committed subarea to store the entire packet;
wherein storing the first part of the packet in the first committed subarea, and storing the second part of the packet in the first shared subarea are in response to determining that there is not enough space in the first committed subarea to store the entire packet.

11. The method of claim 10, further comprising:
de-queuing the packet from the first queue in preparation for transmitting the packet, including:
  removing the first part of the packet from the first committed subarea, and
  removing the second part of the packet from the first shared subarea; and
transmitting the packet via an egress port after de-queuing the packet.

12. A network device for processing packets, the network device comprising:
a plurality of storage resources associated with a plurality of queues, the storage resources comprising a shared area and a committed area,
  the committed area including a first committed subarea to store packets corresponding to a first queue and not to store packet corresponding to other queues, and
  the shared area including a plurality of shared subareas, the plurality of shared subareas including a first shared subarea, the first shared subarea to store packets corresponding to i) at least one of a first traffic type or a first priority, and ii) multiple queues among the plurality of queues, the multiple queues including a first queue, wherein the first shared subarea does not overlap with the first committed subarea, and
a packet queuing engine configured to:
  determine that a first packet received by the network device corresponds to the first queue;
  determine that the first packet corresponds to the at least one of the first traffic type or the first priority;
  determine, based on i) determining that the first packet corresponds to the first queue, and ii) determining that the first packet corresponds to the at least one of the first traffic type or first priority, a storage region for storing the first packet, the storage region including i) the first committed subarea and ii) the first shared subarea;
  store a first part of the first packet in the first committed subarea,
  store a second part of the first packet in the first shared subarea,
  account for the first part of the first packet stored in the committed area, and
  account for the second part of the first packet stored in the shared area.

13. The network device of claim 12, wherein the packet queuing engine is further configured to:
determine the first part of the packet so that a sum of a size of the first part of the packet and a current occupancy level of the first queue is equivalent to a maximum size of the first committed subarea, the current occupancy level of the first queue corresponding to an amount of resources occupied by packets that correspond to the first queue;

account for the first part of the packet stored in the committed area by updating the current occupancy level of the first queue; and determine the second part of the packet to be a remainder of the packet.

14. The network device of claim 13, wherein the packet queuing engine is further configured to drop the packet if the second part of the packet has a size so that a sum of the size of the second part of the packet and a current occupancy level of the first shared subarea is greater than a shared area threshold corresponding to the first shared subarea, the current occupancy level of the first shared subarea corresponding to an amount of resources occupied by packets that correspond to the first shared subarea; and wherein the packet queuing engine is further configured to account for the second part of the packet stored in the first shared subarea by updating the current occupancy level of the first shared subarea.

15. The network device of claim 12, wherein the plurality of queues corresponds to at least one of a plurality of network traffic levels or a plurality of packet priorities, and wherein the plurality of queues are independent of ports.

16. The network device of claim 12, wherein:

the committed area includes a plurality of committed subareas including the first committed subarea;

each of the plurality of committed subareas corresponds to a different queue of the plurality of queues, and the packet queuing engine is further configured to access a plurality of different shared area thresholds, each different shared area threshold corresponding to the shared area and corresponding to a respective queue, and each different shared area threshold indicating a respective allocation of the shared area corresponding to the respective queue.

17. The network device of claim 12, wherein the packet corresponds to one of a plurality of groups of ports, and the packet queuing engine is further configured to access a plurality of different shared area thresholds, each different shared area threshold corresponding to the shared area and corresponding to a respective group of ports, and each different shared area threshold indicating a respective allocation of the shared area corresponding to the respective group of ports.

18. The network device of claim 12, wherein the packet corresponds to one of a plurality of drop priorities, and the packet queuing engine is further configured to access a plurality of different shared area thresholds, each different shared area threshold corresponding to the shared area and corresponding to a respective drop priority, and each different shared area threshold indicating a respective allocation of the shared area corresponding to the respective drop priority.

19. The network device of claim 12, wherein:

the first committed subarea is a first committed subarea in a plurality of committed subareas of the committed area; and each of the plurality of committed subareas corresponds to a different queue of the plurality of queues, and each different queue corresponds to a different shared subarea of the plurality of shared subareas.

20. The network device of claim 12, further comprising a queue fill level indicator corresponding to a current occupancy level of the first queue and a shared area fill level indicator corresponding to a current occupancy level of the first subarea corresponding to the first queue, and wherein the packet queuing engine is further configured to:

determine the first part of the packet based on the queue fill level indicator, determine the second part of the packet based on the shared area fill level indicator, account for the first part of the packet by updating the queue fill level indicator, and account for the second part of the packet by updating the shared area fill level indicator.

21. The network device of claim 12, wherein the packet corresponds to a first group of ports to which the committed area corresponds, and wherein another committed area corresponds to another group of ports.

22. The network device of claim 12, wherein the packet queuing engine is further configured to:

determine whether there is enough space in the first committed subarea to store the entire packet; and store the first part of the packet in the first committed subarea and store the second part of the packet in the first shared subarea in response to determining that there is not enough space in the particular committed area to store the entire packet.

23. The network device of claim 22, further comprising:

a transmit queue scheduler configured to:

de-queue the packet from the first queue in preparation for transmitting the packet, including:

removing the first part of the packet from the first committed subarea, and removing the second part of the packet from the first shared subarea; and a port configured to transmit the packet after de-queuing.

* * * * *